Figure 1:
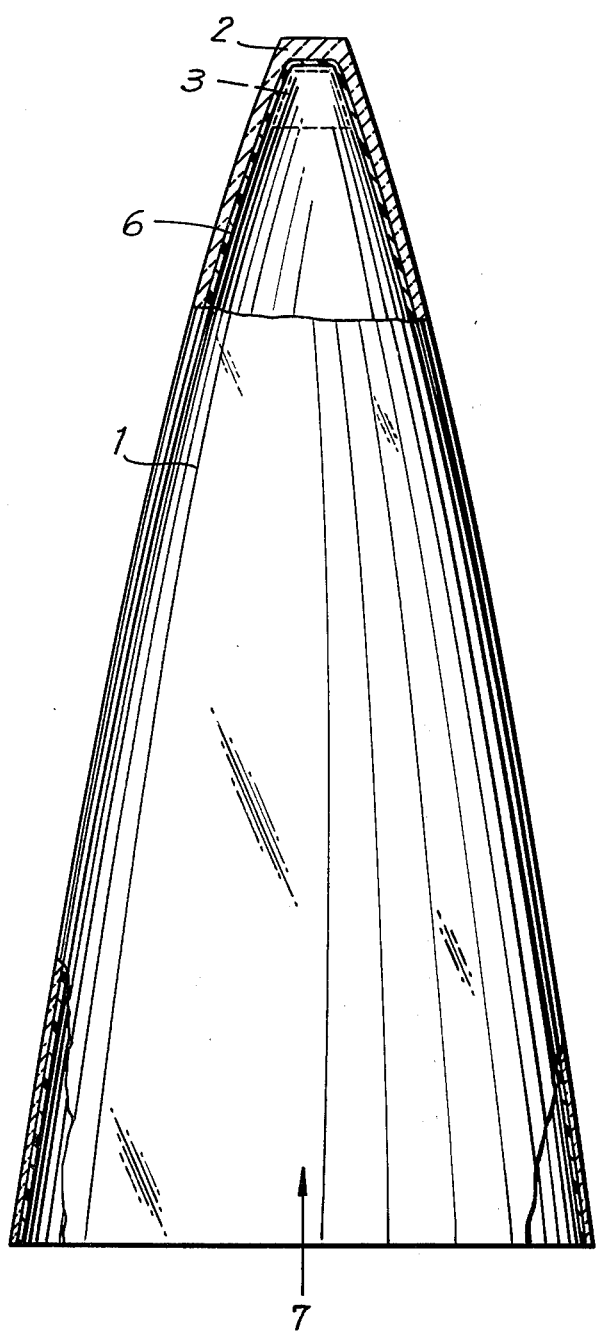

United States Patent [19]

Baruschke et al.

[11] 4,067,950

[45] Jan. 10, 1978

[54] PROCESS FOR MAKING RADOMES

[75] Inventors: Holger Baruschke; Gerhard Wulf, both of Flensburg, Germany

[73] Assignee: Eltro GmbH Gesellschaft fur Strahlungstechnik, Heidelberg, Germany

[21] Appl. No.: 751,975

[22] Filed: Dec. 17, 1976

[30] Foreign Application Priority Data

Dec. 22, 1975 Germany .............................. 2557815

[51] Int. Cl.$^2$ .............................................. B29H 9/02
[52] U.S. Cl. ..................................... 264/257; 264/273; 264/325
[58] Field of Search ............... 264/257, 258, 322, 325, 264/273

[56] References Cited

U.S. PATENT DOCUMENTS

| | | | |
|---|---|---|---|
| 2,797,179 | 6/1957 | Reynolds | 264/257 |
| 3,184,527 | 5/1965 | Fischer | 264/257 X |
| 3,597,425 | 8/1971 | Shaines | 264/255 X |

Primary Examiner—Thomas P. Pavelko
Attorney, Agent, or Firm—Haseltine, Lake & Waters

[57] ABSTRACT

Process for making radomes for the aircraft industry from fabrics and the like of varying weaves, saturated with resins, and allowed to harden in a two-part mold that corresponds to the radome profile, while applying pressure and heat. A stocking-shaped webbing, constituting an outer layer, is inserted into the negative half of the mold, followed by the insertion of a molding material into the so equipped mold half, the material preferably consisting of two components, a resin and fiber clippings various optional steps are suggested by the invention.

8 Claims, 2 Drawing Figures

U.S. Patent  Jan. 10, 1978  4,067,950

PROCESS FOR MAKING RADOMES

This invention relates to a process for making radomes for the aircraft industry, namely from fabrics and the like of varying weaves, saturated or impregnated with resins, and allowed to harden in a form or mold that corresponds to the radome profile, while applying pressure and heat.

The radomes of the just described kinds, for example for nose cones of rockets, essentially consist either of a molding material or mass resulting from several glass-web stockings or layers that are inserted into each other, or of a number of superimposed, previously impregnated material layers of fabrics or webbings, so-called prepregs. In order to increase mechanical resistance and rigidity, the prepregs are often used in connection with resin-impregnated paper honeycombs. The procedures are cumbersome and require a relatively costly use of materials.

It is the object of the invention to improve the known procedures, particularly in respect of the mechanical and thermal characteristics, for making radomes of the described kind.

In accordance with major features of the invention, the hitherto encountered disadvantages are eliminated by inserting into the negative half of a two-part mold a substantially stocking-shaped fabric or webbing that constitutes an outer layer, and then inserting a molding material that is deformed under pressure and heat, into the thus equipped mold half, the molding material preferably consisting of two components.

One of the molding-material components permeates the fabric when the negative and positive mold halves are subsequently connected, while the other component acts as a kind of rear lining for this fabric.

This process and arrangement requires only a single glass-web layer per radome. Low material requirement is coupled with the advantage that the time-consuming cutting to size or punching out of individual layers is being dispensed with. The complicated layering, and the overlapping of the individual lamina, undesirable from the technological standpoint, are also eliminated.

According to a further optional feature of the invention the use of glass webs or glass-silk webs has been found most suitable for the outer layer, while the rear lining of the webbing is preferably constituted by a molding material that consists of fiber clipping previously impregnated with a synthetic resin, which clippings later primarily form the rear lining.

It is also recommended in this connection that the clippings be uniformly distributed over the inner surface of the webbing, in a non-directional manner, the synthetic resin preferably filling the interstices on the sides of the webbing and the clippings, from both the inner and outer sides.

A further, optional feature of the invention relates to the material structure of the radome prepared according to the described procedure, having a composition with a fiber layer or component that is placed above the synthetic-resin component.

In this respect the use of a molding mass is recommended that has the shape of a tablet or lozenge when rigid, and preferably following the inner profile at the bottom of the mold.

The novel, inventive process results in short hardening times, with excellent rigidity characteristics for the final product. It is also an important advantage of the new process that the short hardening times and the rational production method make the process suitable for substantial quantities, and consequently also for serial production.

Figure 2:
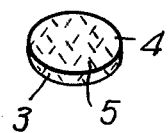

The invention will now be described in further detail, with reference to the accompanying drawing, wherein:

FIG. 1 illustrates an exemplary radome in section, produced in accordance with the inventive process; and FIG. 2 is a fiber-type lozenge that can be used as a pre-shaped molding mass in accordance with the invention.

For making a radome, generally designated by numeral 1 (see FIG. 1), one uses a mold that corresponds to the profile of the radome having the desired shape, the mold not being illustrated, but consisting in a conventional manner of complementary negative and positive mold halves. A stocking 2, preferably consisting of a glass-silk fabric, is placed into the negative mold half, various conventional manners of production being acceptable for weaving the stocking. The latter has preferably a cross-section as can be seen from the upper and lower portions of the radome that are sectioned in FIG. 1 for a better illustration. It can thus be seen that the wall of the stocking 2 is relatively thin toward the bottom of the radome, then gradually increases in thickness up to the top (where the numeral 2 is being applied), and may have a particular shape as illustrated. In other words, the stocking wall becomes thinner from the top toward the opening at the bottom of the radome.

It will be understood by those skilled in the art that other wall thicknesses, stronger and/or weaker wall regions, etc., can be produced without departing form the scope of the present invention.

A molding mass or material 3 is subsequently inserted into the top of the webbing stocking 2 that was placed previously into the negative mold half. The material 3 consists preferably of previously impregnated fiber clippings 4 of about 1.5 centimeters length, and of a synthetic resin 5, for example, epoxy resin. The molding material 3 or mass can be introduced in the form of a lozenge or tablet, as shown in FIG. 2. Subsequently the (not illustrated) positive mold half is introduced into the semi-finished radome in the direction of the arrow 7, that is from below toward the inner top of the structure, which so far included the stocking 2 and the molding material 3.

The two mold halves are now clamped with the application of heat, thereby liquifying the epoxy or other resin 5 that is included in the material 3, so that the fibers 4 that float in the resin 5 that is included in the material 3, are substantially evenly distributed over the entire inner surface of the stocking 2. This results in a rear lining or layer 6 being applied to the entire inner surface of the stocking 2, the epoxy resin 5 contributing to proper distribution over that surface.

It is possible to use the lozenge 3 of the molding material, while rigid, in a form that substantially corresponds to the inner profile of the mold and/or the stocking 2, as has been shown in FIG. 1 in broken lines in the inner top area of the radome 1.

Another portion of the resin 5 permeates the webbing stocking 2, and constitutes therewith a smooth outer surface. The inner and outer layers can be kept so thin that the webbing and fiber structure becomes transparent when removing the radome from the mold.

The composition of the lozenge or material 3 includes preferably 55% fibers and 45% epoxy resin.

According to another, exemplary embodiment of a radome (not illustrated) that can be made according to the present invention, a pointed dome or cupola can be provided instead of the illustrated conical nose of the radome. The composition of the fiber and epoxy-resin components can also be altered.

Several of the possible modifications and changes in the inventive process have been mentioned above. It will be understood by those skilled in the art that the usual changes, additions, modifications and other minor departures of the invention should be considered as falling within the spirit and scope of the present invention.

What we claim is:

1. A process for making radomes for the aircraft industry which include adjoining wider and narrower portions, by the use of a two-part mold that can be clamped and heated for hardening purposes, comprising the steps of inserting in one of the mold halves a substantially stocking-shaped webbing that constitutes therein an outer radome layer, and then inserting a molding material into the thus equipped mold half, the material, to be deformed under pressure and heat when the mold halves are subsequently closed with the application of pressure and heat, wherein the molding material is constituted by at least two components, one component being a resin which permeates the webbing during the subsequent processing to form a smooth outer surface and another component being fiber clippings which do not permeate the webbing during processing and which serve as a rear lining on the inner surface of the webbing and closing the mold under heat and pressure such that the resin permeates the stocking.

2. The process for making radomes, as defined in claim 1, wherein the stocking-shaped webbing consists at least in part of a glass web.

3. The process for making radomes, as defined in claim 1, wherein the molding material includes fiber clippings that are at least partly impregnated with a resin component.

4. The process for making radomes, as defined in claim 3, wherein the fiber clippings are uniformly distributed over the inner surface of the webbing in a non-directional manner, while the resin component fills interstices on the sides of the webbing and the clippings from both the inner and outer sides.

5. The process for making radomes, as defined in claim 3, wherein the fiber clippings constitute the major portion of the molding material.

6. The process for making radomes, as defined in claim 3, wherein the resin component is essentially epoxy resin.

7. The process for making radomes, as defined in claim 1, wherein the molding material is inserted into the mold half, that already includes the stocking-shaped webbing, in the form of a rigid lozenge having a shape at least partly adapted to that of the inner stocking profile.

8. The process for making radomes, as defined in claim 6, wherein the molding material consists of 55% fibers and 45% epoxy resin.

* * * * *